Patented Dec. 14, 1937

2,102,200

UNITED STATES PATENT OFFICE 2,102,200

REFINING DIPHENYL SULPHIDE

Gregg Dougherty, Princeton, N. J.

No Drawing. Application July 3, 1936,
Serial No. 88,909

4 Claims. (Cl. 260—150)

This invention relates to refining diphenyl sulphide; and it relates more particularly to a process of deodorizing diphenyl sulphide by treatment with a halogen under conditions such that the objectionable odor characterizing diphenyl sulphide as heretofore available, however it has been produced, is removed, leaving the refined diphenyl sulphide practically odorless.

Diphenyl sulphide is a high-boiling liquid having valuable properties which, as has long been recognized, would admirably adapt it for certain industrial uses (e. g. as a heat interchanging or transmitting medium, a plasticizer for certain resins, an agent for increasing the film strength of lubricating oils, a dye and drug intermediate, an insecticidal agent). But the fact that, by whichever of the several known practical methods of preparation it is produced, it is contaminated by at least traces of impurities giving to it an offensive odor, has heretofore prevented its use to any substantial extent. These impurities appear to be in the nature of aromatic mercaptans, and their removal has heretofore been regarded as impracticable commercially.

It is accordingly a principal object of the present invention to overcome this difficulty by providing a relatively cheap and simple refining method effective to deodorize malodorous diphenyl sulphide and to yield a novel diphenyl sulphide product that is practically odorless and suitable to be used for purposes for which ordinary diphenyl sulphide, because of its evil odor, is quite unadapted.

It has been found that if the usual malodorous diphenyl sulphide is treated under relatively mild reacting conditions with a small quantity of a halogen either as such or in the form of a compound which readily liberates a halogen, the small content of contaminating impurities responsible for the bad odor is reacted upon selectively and more rapidly than the diphenyl sulphide itself, said impurities being thereby converted into a form that is inoffensive; so that the resultant refined diphenyl sulphide product is substantially odorless. While it is not fully known at present just how the halogen reacts upon the malodorous impurities nor what the exact composition of the resultant conversion products is, the reaction is not an oxidation. There is reason to believe that what occurs may be represented as follows:

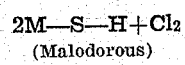 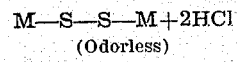

(Malodorous)  (Odorless)

where M is an aromatic radical. At any rate, whatever may be the correct explanation, the nature of the reaction involved, the results achieved by the new method are highly satisfactory. These odorless converted impurities may be present in the deodorized diphenyl sulphide in amounts varying from a small fraction of 1 per cent to as much as 5 per cent, depending upon the extent to which the crude diphenyl sulphide was contaminated. Although they can be removed by appropriate methods, their presence in association with diphenyl sulphide does not adversely affect the desirable properties of the latter and, for some purposes, seems to be advantageous.

In a typical example illustrating the underlying principles of the invention, the novel purifying treatment is applied to diphenyl sulphide produced in the known manner by reacting between sulphur, benzene and aluminum chloride. It is a clear, light yellow liquid with a very disagreeable odor. If a small amount of chlorine gas is passed into this liquid, the odor is gradually diminished and finally is altogether removed. In practice, the chlorine is introduced slowly until the odor is gone.

The amount of chlorine needed to effect the deodorization is in all cases small, being seldom more than 1 per cent by weight of the diphenyl sulphide to be purified, and ordinarily never more than 2 per cent; but use of a larger amount of chlorine, even as much as 10 per cent, does no harm practically. Where such excess is used, it forms some chlorinated diphenyl sulphide which may be removed, if desired, by fractional distillation; but for some purposes removal is unnecessary.

Where chlorine is the halogen employed, the gas may be introduced into the liquid in any suitable manner but most desirably in such a way as to distribute it in fine bubbles throughout the body of liquid. It is advantageous, although not indispensable, to stir or otherwise agitate the diphenyl sulphide while passing the chlorine into it. Various forms of apparatus suitable for carrying out the deodorizing treatment under the described conditions are available and require no description here. Considerable latitude is permissible as regards the operating temperature employed. A convenient and very effective temperature range is 20°–30° C.; but the deodorizing reaction takes place at considerably lower temperatures, and higher temperatures may but need not be used. From 0° to 35° C. is a sufficiently wide working range in practice; although this is to be understood as not restrictive but as merely generally indicative of temperature limits outside of which it is ordinarily not necessary to go in order to attain satisfactory results. Since some hydrogen chloride is formed in the process, the product is washed with a dilute aqueous solution of an alkali (e. g. sodium hydroxide) until there is no acidity. Since the diphenyl sulphide does not mix with the alkaline wash solution, separation of the refined product after the washing is easily accomplished. The treatment of diphenyl sulphide with the halogen should be continued until a test sample, washed with alkaline solution as described, shows the desired freedom from odor.

Instead of using free chlorine gas, similar results can be obtained with an aqueous solution of chlorine or of sodium hypochlorite. Any suitable agent comprising available chlorine, such as a compound capable of liberating chlorine in reactive condition, may be employed. Also bromine, as such or in other available form, may serve as the deodorizing agent in the novel refining process.

What I claim is:

1. The process of treating diphenyl sulphide for removal of unpleasant odor, which comprises subjecting such diphenyl sulphide to the action of a halogen.

2. The process of treating diphenyl sulphide for removal of unpleasant odor, which comprises subjecting such diphenyl sulphide to the action of chlorine in available form.

3. The process of treating diphenyl sulphide for removal of unpleasant odor, which comprises subjecting such diphenyl sulphide to the action of bromine in available form.

4. As a new composition of matter, diphenyl sulphide associated with substantially odorless conversion products of malodorous impurities usually characterizing unrefined diphenyl sulphide, said conversion products being those which result from subjecting unrefined diphenyl sulphide to the action of a halogen.

GREGG DOUGHERTY.